United States Patent [19]
Reed

[11] Patent Number: 5,772,019
[45] Date of Patent: Jun. 30, 1998

[54] PACKAGING ARRANGEMENT FOR STORAGE DISCS AND METHOD FOR MAKING THE SAME

[76] Inventor: Richard T. Reed, 2433 Garfias Dr., Pasadena, Calif. 91104

[21] Appl. No.: 802,718

[22] Filed: Feb. 20, 1997

Related U.S. Application Data

[63] Continuation of Ser. No. 552,270, Nov. 2, 1995, abandoned.

[51] Int. Cl.$^6$ .................................................. B65D 85/57
[52] U.S. Cl. ...................... 206/308.1; 206/311; 206/313
[58] Field of Search ................ 206/425, 308.1, 206/308.3, 307, 307.1, 309, 310, 311, 312, 313, 232, 815

[56] References Cited

U.S. PATENT DOCUMENTS

| | | | |
|---|---|---|---|
| 2,691,440 | 10/1954 | Spugios et al. | |
| 2,850,158 | 9/1958 | Woodward. | |
| 2,881,912 | 4/1959 | Kursh. | |
| 3,232,421 | 2/1966 | Young. | |
| 3,522,907 | 8/1970 | Utterback, Jr. | |
| 3,595,383 | 7/1971 | Boylan. | |
| 4,640,413 | 2/1987 | Kaplan et al. | 206/232 |
| 4,709,812 | 12/1987 | Kosterka | 206/310 |
| 4,852,740 | 8/1989 | Sellar et al. | |
| 4,905,831 | 3/1990 | Bagdis et al. | |
| 5,085,318 | 2/1992 | Leverick | 206/312 |
| 5,090,561 | 2/1992 | Spector | 206/313 |
| 5,186,327 | 2/1993 | McCafferty et al. | 206/313 |
| 5,188,229 | 2/1993 | Bernstein | 206/310 X |
| 5,205,405 | 4/1993 | O'Brien et al. | 206/310 |
| 5,207,717 | 5/1993 | Manning | 206/232 |
| 5,284,242 | 2/1994 | Roth et al. | 206/310 |
| 5,289,918 | 3/1994 | Dobias et al. | 206/312 |
| 5,333,728 | 8/1994 | O'Brien et al. | 206/232 |
| 5,422,875 | 6/1995 | Bribach | 206/312 X |
| 5,460,265 | 10/1995 | Kiolbasa | 206/308.1 |

FOREIGN PATENT DOCUMENTS

| | | |
|---|---|---|
| 8702565 | 5/1989 | Netherlands. |
| 2187442 | 9/1987 | United Kingdom. |
| 9324927 | 12/1993 | WIPO. |
| 9427892 | 12/1994 | WIPO. |

*Primary Examiner*—Jacob K. Ackun
*Attorney, Agent, or Firm*—Christie, Parker & Hale, LLP

[57] ABSTRACT

A packaging arrangement for storage discs is formed from a single paperboard blank. The blank is partitioned into a plurality of die-cut panels folded and adhered to a base panel to form a multilayer laminated paperboard packaging arrangement for storing and transporting storage discs. The die-cut panels form a recess for receiving the storage disc. A removable adhesive label is provided to retain the storage disc in the recess. The adhesive label may be designed to indicate whether access to the storage disc was gained by a user. The packaging arrangement may be adapted for binding in a book or magazine or serve as a postal mailer.

18 Claims, 7 Drawing Sheets

PACKAGING ARRANGEMENT FOR STORAGE DISCS AND METHOD FOR MAKING THE SAME

CROSS-REFERENCE TO RELATED APPLICATION

This is a continuation of application Ser. No. 08/552,270, filed Nov. 2, 1995 and now abandoned.

FIELD OF INVENTION

The present invention relates to packaging arrangements for storage discs and more specifically to a multilayer laminated paperboard packaging arrangement for receiving and retaining storage discs.

BACKGROUND OF THE INVENTION

In recent years, the audio compact disc and the CD ROM have emerged as one of the most popular mediums for storing audio and computer information. Heretofore, these storage medium discs have been packaged for wholesale and retail distribution in clear packages known as jewel boxes. These jewel boxes generally comprise three separate pieces of plastic, including a clear front and back panel and an opaque compact disc holder which snap-fits into the back panel. The front and back panels are normally hinged along one edge so as to open like a book. Preprinted inserts are required to display promotional material accompanying the storage medium.

The conventional jewel box construction is very bulky and expensive to manufacture. Because the jewel box must be transparent to display the promotional material, the box must constructed with injection molded plastic of the polystyrene type. Moreover, the three plastic pieces must be manually fitted together and the promotional material physically inserted.

This package was well suited during the development stage of the compact audio disc and CD ROM. However, with the rapid increase of storage discs as an information medium, the drawbacks of the jewel box package are becoming more pronounced. For example, it is desirable to package information contained in a book or magazine not only in printed form, but also in compact disc form. Currently, however, there are no packaging arrangements which would allow a compact disc to be bound with a book.

The mailing of information on a storage disc is also desirable. Currently, CD ROMs and compact audio discs are either shipped in a jewel box inside a carton or in bubble pack wrapping enclosed in a plastic envelope. Both methods suffer from excessive handling and additional mailing fees.

Accordingly, there is a current need for a storage disc package which is both simple and inexpensive to manufacture and can be adapted for binding in a book or magazine or converted to a postal mailer.

SUMMARY OF THE INVENTION

The present invention is directed to a packaging arrangement that satisfies this need. There is, therefore, provided according to a preferred embodiment a multilayer laminated paperboard packaging arrangement having a paperboard base for supporting one face of the storage disc and a plurality of substantially identical paperboard layers laminated together for containing the perimeter of the storage disc. The laminated layers are affixed by an adhesive to the paperboard base. The laminated layers are formed with an opening of sufficient size for receiving and retaining the storage disc.

Preferably, the packaging arrangement includes a removable adhesive label positioned over the entire opening for retaining the storage disc therein. The label may be designed to be permanently altered when removed from the opening and thereby serve as a security device to determine whether the storage disc has been accessed.

Preferably, the packaging arrangement includes a side flap extending from an edge thereof for binding with a book or magazine. This arrangement is particularly attractive when an abundance of detailed information is desired to augment the printed material without significantly increasing the size of the book or magazine.

Alternatively, the side flap may be folded and extended over the entire opening of the packaging arrangement and adhered thereto to form a postal mailer or a sealed package for retail distribution. When used as a postal mailer, high speed automated addressing and mailing can be achieved at reduced cost.

In one embodiment, the packaging arrangement is fabricated from a continuous paperboard sheet partitioned into panels and cut to form a blank. All but one panel is subjected to the cutting process. The one panel which is not cut serves as a base panel for the storage disc. The blank is then folded so that the cut-outs in each panel form a recess with the base panel for receiving and retaining the storage disc. The recess is defined by the superposed cut-outs of the folded panels.

Preferably, the panels are roll folded which entails positioning the base panel at one end of the paperboard blank and sequentially folding the end portion of the paperboard blank opposite the end panel onto an adjacent panel until the packing arrangement is complete.

An attractive feature of using a single paperboard sheet is that the packaging arrangement can be processed on high speed equipment for die-cutting, printing and gluing operations, resulting in a package that is both simple and inexpensive to manufacture.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
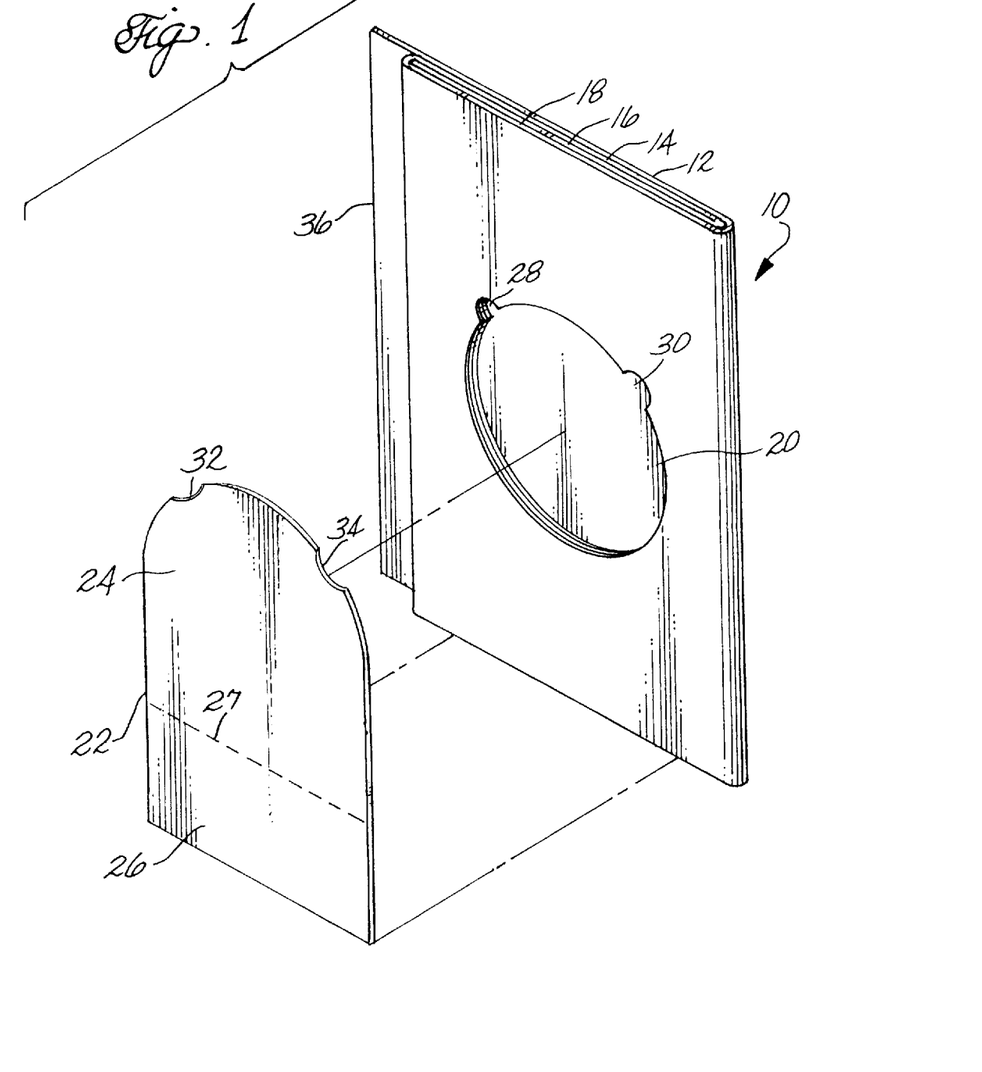
FIG. 1 is a perspective view of an embodiment of the present invention having a side flap for perfect binding into a book or magazine.

In a preferred embodiment of the present invention, a multilayer laminated paperboard packaging arrangement 10 for storing and transporting a storage disc is shown in FIG. 1. "Storage disc" as used herein is defined as a CD ROM, compact audio disc, or any other informational medium stored on a substantially flat disc. The packaging arrangement 10 includes a base panel 12 constructed from flexible paperboard or other moderately rigid material. Three substantially identical die-cut panels 14, 16, 18, are laminated together and adhered to the base panel 12 to form a recess 20 for receiving the storage disc (not shown). The die-cut panels are typically rectangular and similarly constructed from flexible paperboard or the like. As will be appreciated, the circumference of the recess 20 will be approximately, but slightly larger than, the circumference of the storage disc to prevent lateral movement during transportation.

To accommodate the thickness of the storage disc (approximately 0.050") a four layer laminate formed from standard 18-point paperboard is preferable. This configuration results in a recess depth of 0.052" formed by die-cut panels 14, 16 and 18. Moreover, 18-point paperboard can be fed into a normal printing press for printing of licensing agreements, instructions, promotional material and the like. This eliminates the labor intense activity of inserting separate preprinted material into the packaging arrangement typically encountered in the standard jewel box arrangement. It will be understood by one having ordinary skill in the art that storage mediums of different thicknesses can be accommodated by increasing or decreasing the number of laminated layers or by selecting an alternative paperboard thickness.

An adhesive label 22 is affixed to the die-cut panel 18 and positioned over the recess 20 for retaining the storage disc during transport. The adhesive label is preferably a tear resistant synthetic product such as polyart, kimdura, tyvek or the like. Kimdura, which resembles paper stock, is particularly desirable due to its aesthetics and its ability to act as a good substrate for printed material.

The adhesive label is divided into an upper portion 24 and a lower portion 26 separated by a channel score or hinge 27. The upper portion 24 is removably adhered around the periphery of the recess to retain the storage disc in place during transport while allowing access thereto by a user. Access is gained by merely peeling back the upper portion 24 of the label. The lower portion 26 is permanently adhered to the die-cut panel 18 to provide support to the hinge 27. No adhesive should be applied to the interior of the upper portion 24 contacting the storage disc, however, a small amount of adhesive may be applied in the center where a spindle would typically be positioned in a jewel box arrangement.

The adhesive applied to the upper portion 24 is preferably a semi aggressive removable adhesive. This configuration allows the product to be opened and closed numerous times for restoring the disc. Alternatively, the label may be provided with a security film, such as mylar designed to tear when opened. The label will still be resealable but tampering will be evident. This approach is particularly attractive for preventing unauthorized access of the storage disc by a purchaser. For example, if a purchaser of the product removes the storage disc from the packing arrangement with the intent of copying the data and returning the product to the vendor, the vendor would be able to determine whether the purchaser gained access to the storage disc by examining the label.

To facilitate the removal of the label, the die-cut panels, 14, 16 and 18 are formed with finger wells 28 and 30. The finger wells 28 and 30 allow a user to reach underneath the label so that it may easily be peeled back. Preferably, the label is formed with two indentations, 32 and 34, for better exposure of the finger wells to the user without exposing the disc.

In one embodiment, the packaging arrangement is formed with an extended flap 36 for perfect binding into a book or magazine. Flap 36 is made by making panel 12 wider than panels 14–18. It is envisioned that this embodiment may be particularly attractive for corporate annual reports, promotional material and strategic business plans, where an abundance of detailed information can be stored on a disc to augment the printed material. The perfect binding of the book or magazine may be performed by any means known in the art. By way of example, the packaging arrangement is held in place with several signatures of a book and the signatures along with the extended flap 36 are ground off to form the spine. Adhesive is then applied to the spine and a cover is fitted over the book. Once the book is perfect bound, it is subject to a 3-knife trim (including panels 12–18) around the periphery of the pages to produce aesthetically pleasing flat edges.

The use of the extended flap 36 for perfect binding the book is ideal for reducing the thickness of the spine irrespective of the number of laminated layers of the packaging arrangement. Moreover, by increasing the length of the extended flap, the impact of the thickness of the laminated layers on the perfect binding process can be reduced.

Figure 2:
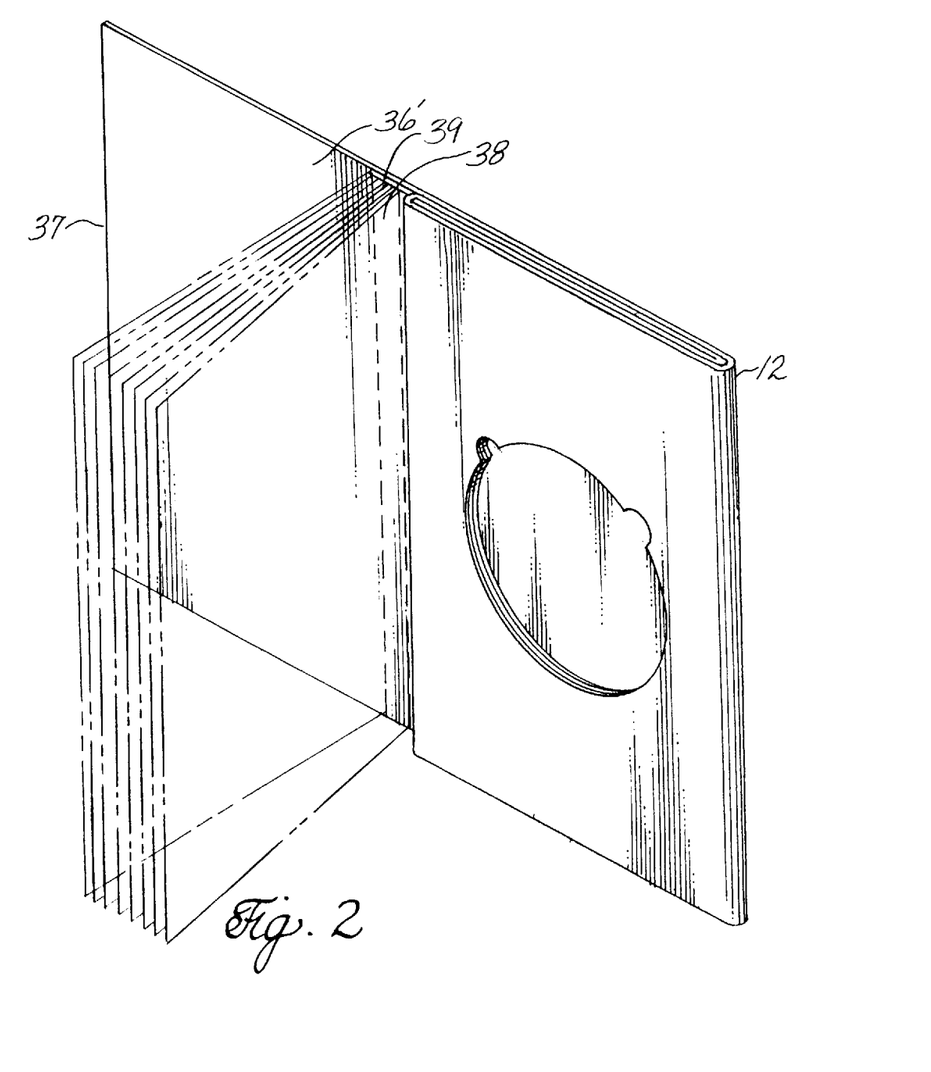
FIG. 2 is a perspective view of an embodiment of the present invention having a side flap with a channel score for binding signatures of a book or magazine therein.

In an alternative embodiment, the packaging arrangement 37 may serve as a cover for a perfect bound book as illustrated in FIG. 2. In this embodiment, the extended flap 36' is lengthened and formed with a channel score 38 for dividing the base panel 12 into two substantially equal panels. Signatures are first ground off and adhered together to form the spine 39 of the book. The spine is then inserted into the channel score 38' whose width is commensurate with the thickness of the spine. Once perfect bound, the book is similarly subject to a 3-knife trim to produce flat edges around the periphery of the pages.

Figure 3:
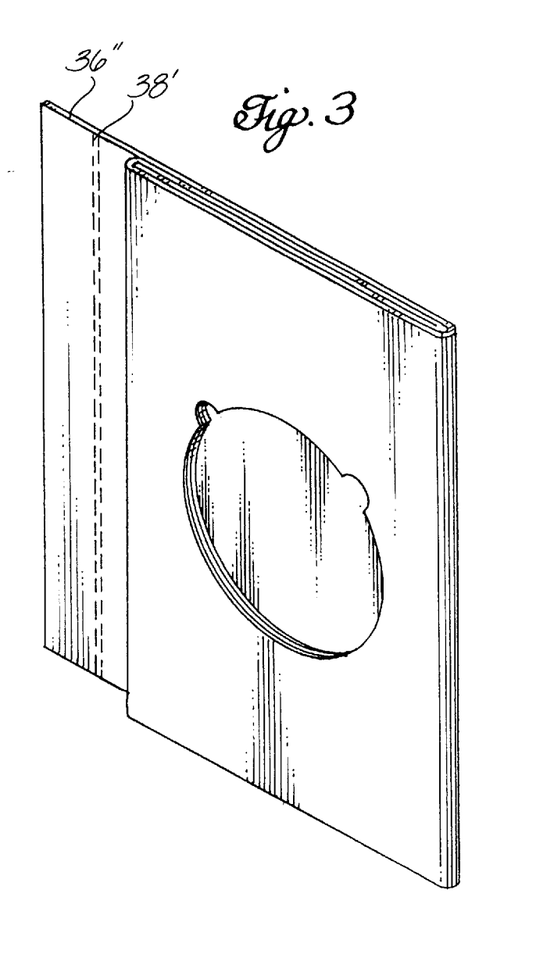
FIG. 3 is a perspective view of an embodiment of the present invention having a side flap with a channel score for stitch binding into a book or magazine.

Turning to FIG. 3, the extended flap 36" is formed with a channel score 38' for stitch binding into a magazine or book. In this embodiment, the channel score 38' of the packaging arrangement is positioned on a conveyor belt saddle (not shown). As the packaging arrangement is longitudinally conveyed, signatures are released on top of the packaging arrangement until the entire book is formed. The channel score 38' and signatures are stitched together and the book is subject to a 3-knife trim.

Figure 4:
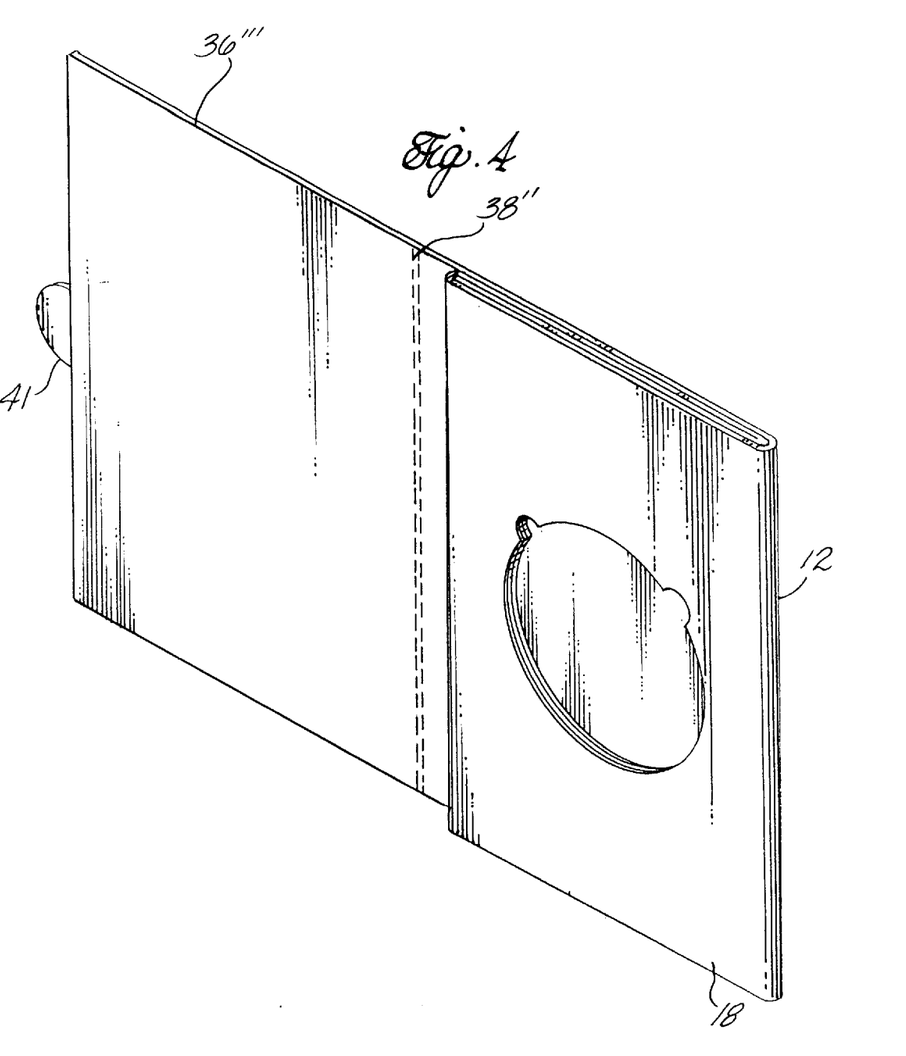
FIG. 4 is a perspective view of an embodiment of the present invention having an extended side flap with a channel score adapted to form a postal mailer.

Alternatively, the extended flap may be configured to form a postal mailer or a storage disc sales package. This embodiment is illustrated in FIG. 4. The extended flap 36''' is designed to fold over the storage disc about a channel score 38". A suitable adhesive is applied to the extended flap 36''' and the die-cut panel 18 to seal the package. The adhesive may be similar to that described above for the label or any other means known in the art. Alternatively, a circular adhesive tab 41 may be attached to the back side of the extended flap 36''' and adhered to the back side of the base panel 12 once the package is folded. In the postal mailer embodiment, this packaging arrangement enables high speed automated addressing and mailing at reduced cost, resulting in a commercially feasible method to mail large quantities of storage discs to consumers. In the sales packaging arrangement, the package can be shrink wrapped and placed with a vendor for retail distribution.

Figure 5:
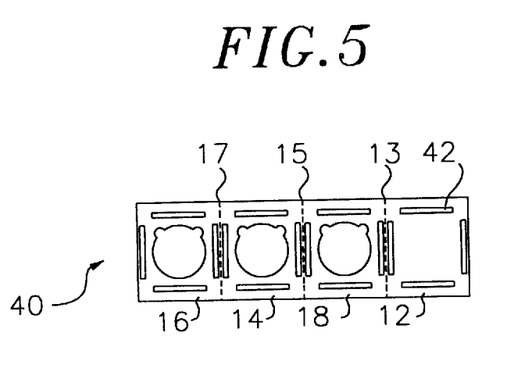
FIG. 5 shows a continuous blank for producing a packaging arrangement in accordance with an embodiment of the present invention.

Turning to FIG. 5, the packaging arrangement is preferably constructed from a single paperboard sheet 40 with a roll fold. The roll fold is best implemented by forming the paperboard sheet 40 into four generally rectangular panels 12, 14, 16 and 18 having channel scores 13, 15, and 17 therebetween. Rectangular panels 14, 16, and 18 are die-cut so that when the panels are foldably engaged with the end panel 12, a recess is formed for receiving and retaining the storage disc. The packaging arrangement is formed by first folding panel 16 about its channel score 17 onto panel 14. The panels are secured together by adhesive or any desired technique known in the art. With panels 14 and 16 secured together, these panels are folded about channel score 15 and adhered to panel 18 to define a three layer laminate with panel 16 sandwiched between panels 14 and 18. The final step entails folding the three layer laminate about channel score 13 and adhering to panel 12 thereby yielding the configuration of FIG. 1.

The adhesive should be applied to the panels in a such a manner that it is unaffected by the 3-knife trim. This generally requires applying adhesive strips 42 about the periphery of the panels out to the edges and applying the 3-knife trim along the glue strips so that the package does not tend to peel once trimmed. The adhesive should also provide structural support resulting in a more rigid package and prevent the storage disc from being laterally displaced between the panels.

Alternatively, the packaging arrangement can be formed with a W-fold. This process is performed by first folding panel 12 and panel 16 into face to face alignment with panels 18 and 14 respectively. The packaging arrangement is then folded along channel score 15 in a direction opposite to the fold of channel scores 13 and 17. The disadvantage of using a W-fold, however, is that the paperboard sheet 40 may require printing on both sides. In contrast, with the roll fold, the paperboard sheet need only be printed on the back side of panels 18 and 12 to provide printing on both sides of the packaging arrangement once folded resulting in reduced printing costs.

Figure 6:
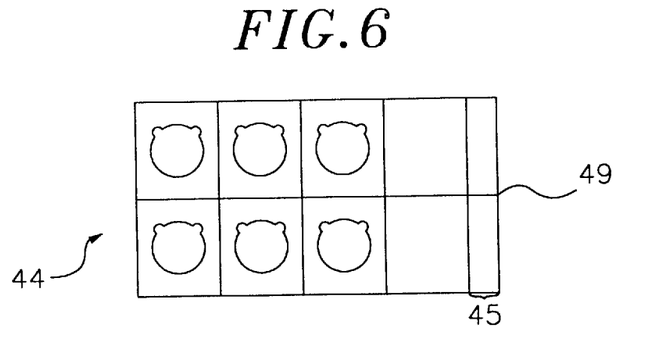
FIG. 6 shows a continuous blank for producing two packaging arrangements in accordance with an embodiment of the present invention.
Figure 7:
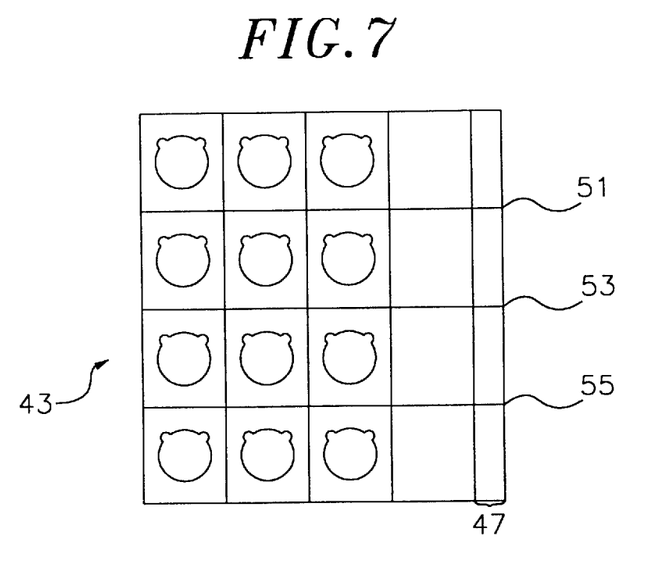
FIG. 7 shows a continuous blank for producing four packaging arrangements in accordance with an embodiment of the present invention.

FIGS. 6 and 7 illustrate a process wherein a plurality of packaging arrangements can be formed from one single paperboard sheet 44 and 43 respectively. Standard paperboard stock, 40"×28" is preferable because it is commercially available at a low cost and can be processed on high speed equipment such as Bobst die-cutter. The paperboard sheet may be partitioned into two 8½"×11" packaging arrangements separated by a cutting knife in the die 49 as shown in FIG. 6 or four 5½"×8½" packaging arrangements separated by cutting knife in the die 51, 53 and 55 as shown in FIG. 7. Each of these packaging arrangements are formed with a 1" extended flap 45 and 47, respectively, for perfect binding with a book or magazine. The packaging arrangements are preferably separated during the die-cutting process along cut line 49 for the 8½"×11" packaging arrangements and along channel scores 51, 53 and 55 for the 5½"×8½" packaging arrangements folded with a roll or W-fold as described above. It will be appreciated by one of ordinary skill in the art that any number of packaging arrangements can be formed from a single paperboard sheet.

The particular arrangements described above are believed to be the most cost effective approaches for producing this product.

Figures 8, 9, 10:
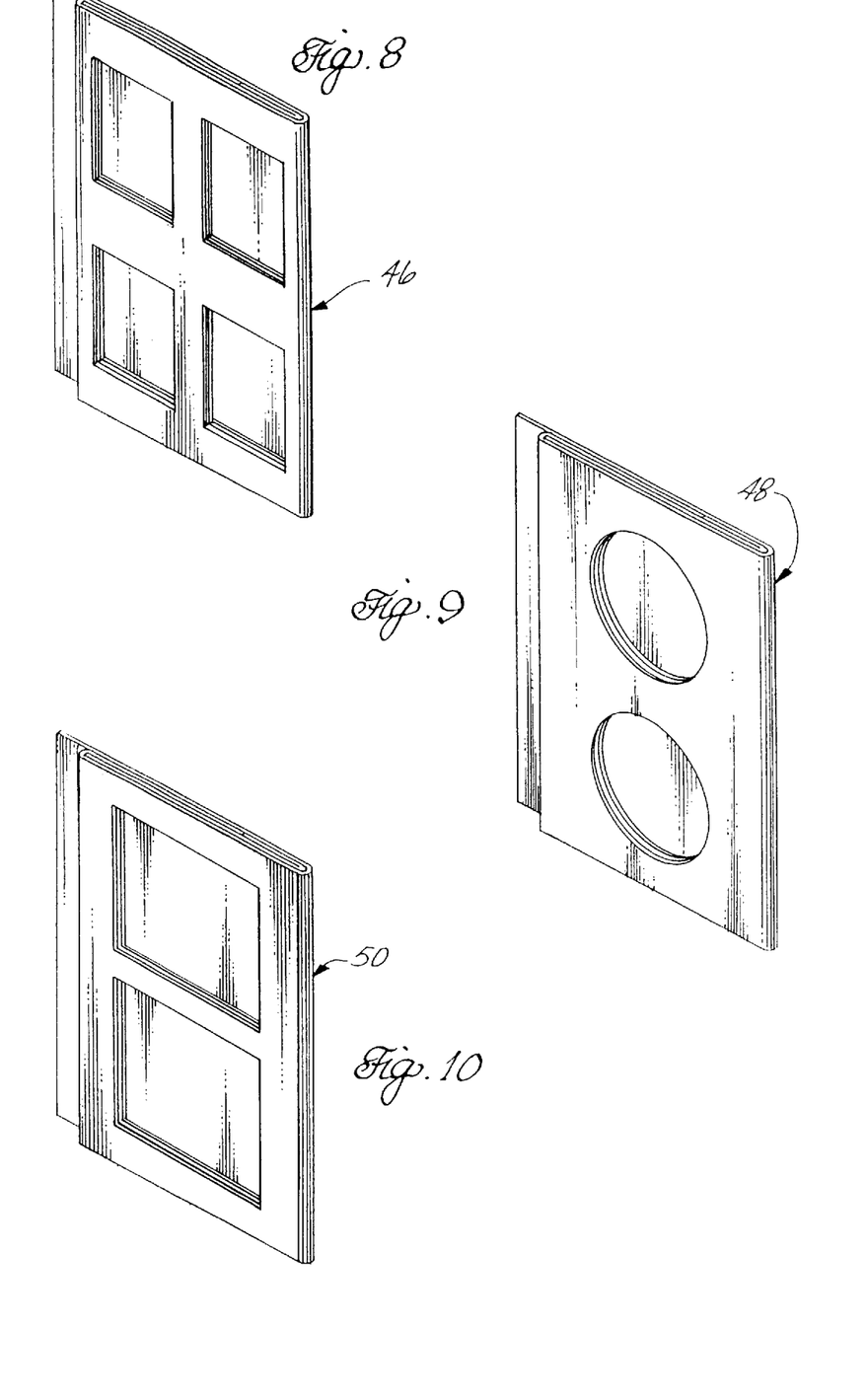
FIG. 8 is a perspective view of an embodiment of the present invention for storing four 3½" floppy discs.
FIG. 9 is a perspective view of an embodiment of the present invention for storing two CD ROMS.
FIG. 10 is a perspective view of an embodiment of the present invention for storing two 5¼" floppy discs.

FIGS. 8, 9, and 10 illustrate a standard 8½"×11" package wherein four 3½" floppy discs, two 4¾" CD ROMS or two 5¼" floppy discs may be stored in a single packaging arrangement, 46, 48 and 50 respectively. An individual adhesive label may be provided for each disc or alternatively a single label for sealing the entire packaging arrangement. It will be appreciated by one of ordinary skill in the art that various combinations of 3½", 4¾", and 5¼" storage discs may be packaged in a single packaging arrangement.

Figure 11:
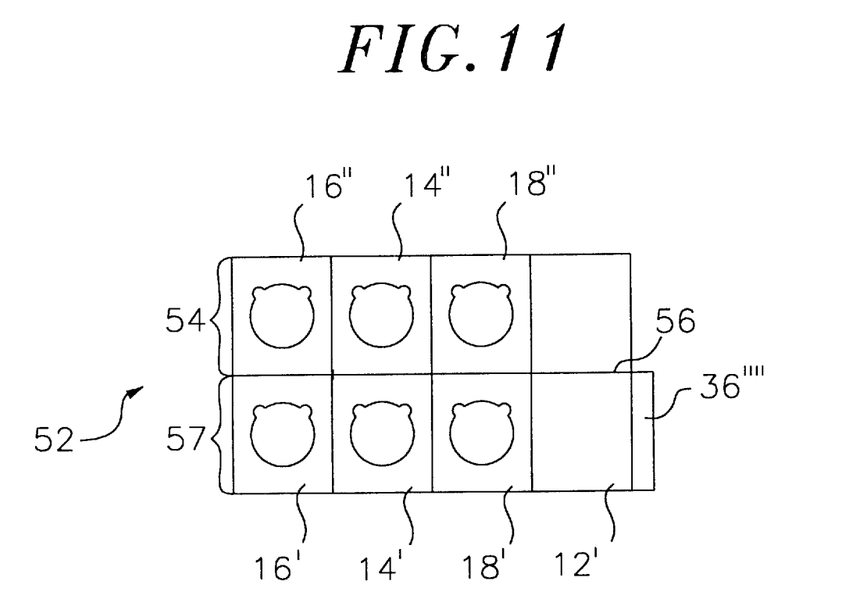
FIG. 11 shows a continuous blank for producing a foldably engageable packaging arrangement.

Turning to FIG. 11, a single paperboard sheet 52 is partitioned into two rows of four generally rectangular panels. Similar to the manufacturing process described above, rectangular panels 14',14", 16', 16", 18' and 18" are die-cut so that when the panels of each row are foldably engaged about channel scores 13', 15' and 17', two recesses are formed, each capable of storing and retaining a storage disc therein. An end panel 12' is formed with an extended flap 36"" for binding with other material. The extended flap 36"" may be adapted for perfect or stitch binding in accordance with the teachings described herein. The upper portion 54 is configured as a fold-out section in the packaging arrangement for accessing a storage disc in either the upper or lower portion, 54 or 57, respectively. The fold-out is folded about channel score 56 during transport or storing of the storage discs. The fold-out packaging arrangement embodiment can be designed to retain several storage discs in each section as described above.

It is apparent from the foregoing that the present invention satisfies an immediate need for a storage disc package which is both simple and inexpensive to manufacturer which can be adapted for binding in a book or magazine or converted to a postal mailer. The present invention satisfies this need by providing a packaging arrangement formed from a multilayer laminated paperboard. This packaging arrangement may be embodied in other specific forms and used for storing a variety of devices without departing from the spirit or essential attributes of the present invention. It is therefore desired that the present embodiment be considered in all respects as illustrative and not restrictive, reference being made to the appended claims rather than the foregoing description to indicate the scope of the invention.

What is claimed is:

1. A multilayer laminated paperboard packaging arrangement for a storage disc comprising:

a paperboard base panel for supporting the storage disc;

a plurality of substantially identical paperboard panels laminated together and affixed by an adhesive to said base panel, said plurality of panels being formed with a substantially circular opening with said plurality of panels surrounding the entire opening, said plurality of panels being of sufficient size for receiving the storage disc flush with said base panel so that said base panel forms a support for one face of the storage disc; and an adhesive label removable adhered to said plurality of panels, said adhesive label having a portion covering substantially the entire opening for retaining the storage disc in said opening.

2. The packaging arrangement of claim 1 wherein said base panel includes a side flap extending from an edge of said plurality of panels, said side flap being adapted for binding with other material.

3. The packaging arrangement of claim 2 wherein said side flap is formed with a channel score.

4. The packaging arrangement of claim 3 wherein said channel score provides a spine for binding with other material.

5. The packaging arrangement of claim 1 wherein said base panel includes a side flap extending from an edge of said plurality of panels, said side flap being foldably joined with said plurality of panels to seal the packaging arrangement.

6. The packaging arrangement of claim 1 wherein said portion of said adhesive label is permanently altered when removed from said plurality of panels for indicating access to the storage disc by a user.

7. The packaging arrangement of claim 1 wherein said opening includes a well which extends beyond a periphery of said portion of said adhesive label to facilitate the removal of the adhesive label.

8. The packaging arrangement of claim 7 wherein said well is semi-circular.

9. The packaging arrangement of claim 1 wherein said base panel and each of said plurality of panels are integrally formed with each other.

10. The arrangement of claim 1, in which the panels are all 18-point paperboard.

11. The arrangement of claim 1, additionally comprising means for covering the opening to retain the disk in place.

12. The package of claim 11, in which the panels are all 18-point paperboard.

13. The package of claim 11, additionally comprising a fourth paperboard panel laminated to the first, second, and third panels, the fourth panel being adjacent to the third panel and having a circular opening that forms part of the side wall.

14. The package of claim 12, additionally comprising a fifth paperboard panel laminated to the first, second, third, and fourth panels, the fifth panel being adjacent to the fourth panel and having a circular opening that forms part of the side wall.

15. The package of claim 13, in which the panels are all 18-point paperboard.

16. The package of claim 11, in which the covering means comprises a side flap attached to the third panel.

17. A compact disk package comprising:

first, second, and third laminated paperboard panels, the second and third panels being adjacent to each other and having aligned circular openings, the first panel being adjacent to the second panel and having a flat surface adjacent to the opening in the second panel, the panels forming together a recess having a circular floor and a cylindrical side wall with approximately a 4.75 inch diameter for receiving a compact disk without lateral movement; and means for covering the recess to retain the disk in place.

18. A multilayer laminated paperboard packaging arrangement comprising:

a storage disc;

a paperboard base panel for supporting the storage disc; and a plurality of substantially identical paperboard panels laminated together and affixed by an adhesive to said base panel, said plurality of panels being formed with a substantially circular opening with said plurality of panels surrounding the entire opening, said plurality of panels being of sufficient size for receiving and retaining the storage disc flush with said base panel so that said base panel forms a support for one face of the storage disc.

* * * * *